Patented Aug. 24, 1926.

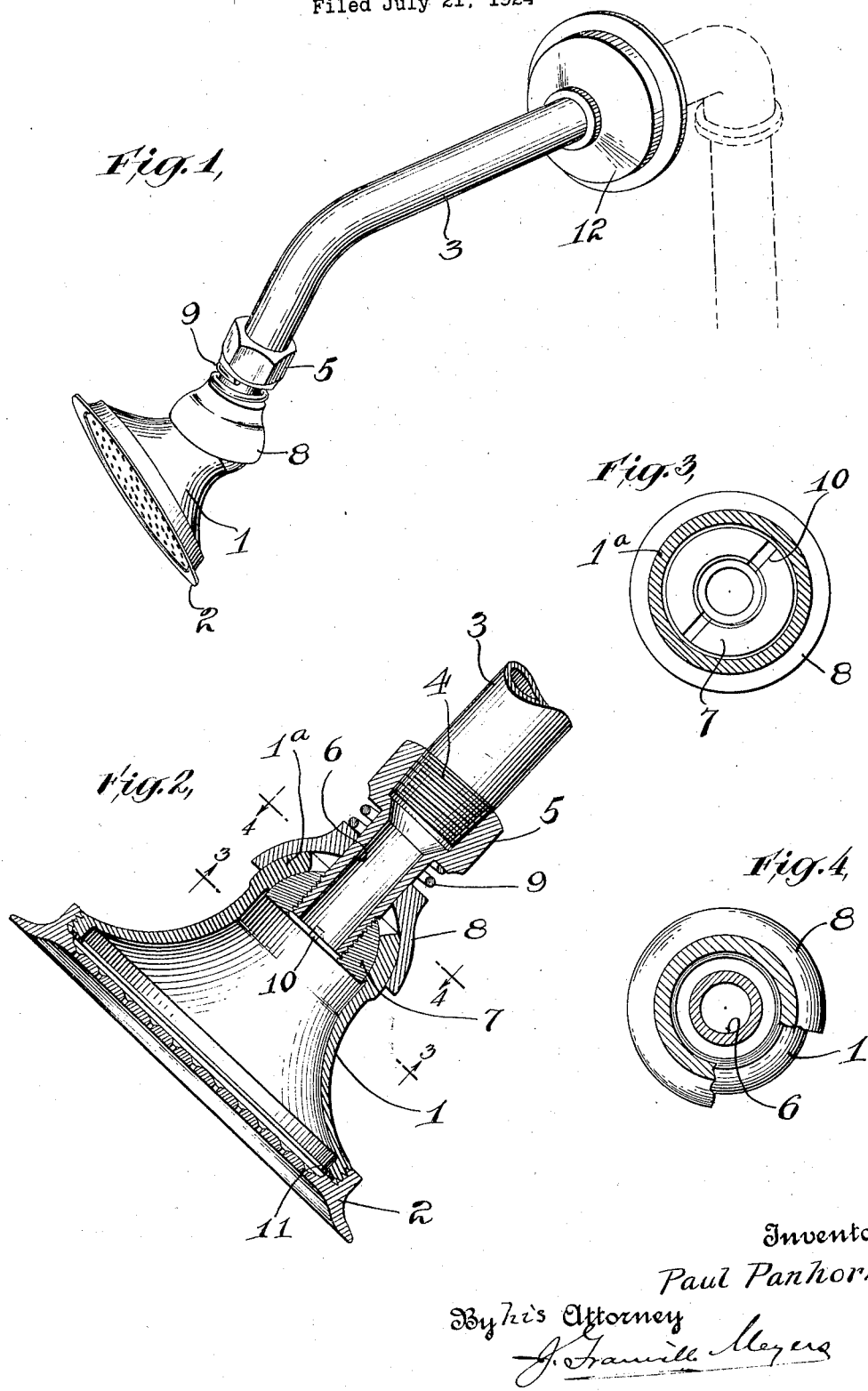

1,597,477

UNITED STATES PATENT OFFICE.

PAUL PANHORST, OF PHILADELPHIA, PENNSYLVANIA, ASSIGNOR TO TEST-TITE COMPANY, A PARTNERSHIP CONSISTING OF PAUL PANHORST AND JOHN G. ZOLLEIS, OF PHILADELPHIA, PENNSYLVANIA.

SHOWER-BATH HEAD.

Application filed July 21, 1924. Serial No. 727,238.

My invention is an improvement in bath fixtures, and with respect to its more specific features to spray heads for such fixtures.

A primary object of the present invention is the provision of a universal joint connection wherein the means for attaching and detaching the head from the water supply pipe is within the head, forms a part of the joint and is accessible by the removal of the perforated cap which forms a part of the head.

Another object is to provide a connection between the head and the arm which will permit universal adjustment of the head by moving the head without any manipulation of any parts, and which will hold its position of adjustment of its own accord.

To the accomplishment of the foregoing and such other objects as may hereinafter appear, my invention consists in the elements and their relation one to the other, as hereinafter defined in the appended claims, reference being had to the accompanying drawings forming a part hereof, which show a preferred embodiment of the invention, and in which:

Fig. 1 is a perspective view of the improved fixture.

Fig. 2 is a longitudinal section through the universal joint connection between the head and its supporting arm.

Figs. 3 and 4 are sections on the lines 3—3 and 4—4 respectively, of Fig. 2.

In the present embodiment of the invention the improved spray head comprises a substantially conical or tapering hollow body 1, having connected with the large end thereof a perforate cap portion, the said portion being threaded onto the large end of the body in the present instance, as shown in Fig. 2. The water supply pipe 3, which in the present instance is the supporting arm for the head, has the end adjacent to the head threaded, as indicated at 4, and a nut 5 is engaged with the threaded portion, the nut having an integral reduced sleeve portion which extends through the small end 1$^a$ of the body, as shown, to provide a connection between the body and the arm 3.

A collar 7 is threaded onto the end of the sleeve portion within the body, the collar serving as a stop for limiting the movement of the head with respect to the arm in one direction. Referring to Fig. 2, it will be noticed that the contacting surfaces of the body and the collar are spherical, to provide for angular movement of the head with respect to the arm, as well as for rotating movement. The connection is in effect a ball and socket or universal joint, the socket element being an integral part of the body, the small end 1$^a$ thereof, while the other element is detachably connected with the supporting arm, through the intermediary of the sleeve nut 5—6. The parts are held in adjusted position, by means of a washer 8, mounted to slide on the sleeve portion of the nut 5—6, and normally urged toward the body by a coil spring 9, which is arranged between the portion 5 of the sleeve nut, and the adjacent end of the washer 8. The washer has an extension which overlies the outer face of the adjacent end of the head, and covers and conceals the opening through which the supply pipe extends. The contacting surfaces of the washer and of the small end of the body are also spherical, formed on the same radius as the contacting surfaces of the body and collar, so that the said surfaces make a water-tight joint, while at the same time they permit free movement of the head with respect to the arm in every direction.

The spring 9 is of sufficient strength to hold the parts in adjusted position, but not strong enough to interfere with the easy adjustment of the parts, and the collar 7 has threaded engagement with the sleeve nut, to facilitate assembling and disassembling of the parts. In assembling the parts, the sleeve of the sleeve nut is inserted into the small end of the body, with the washer 8 and spring 9 in place and with the perforate head portion 2 removed. The collar is now engaged with the end of the sleeve nut, and turned to the desired position, the said collar having a transverse kerf 10, as shown, for the engagement of a suitable tool to turn the same. The collar is tightened until there is sufficient tension on the spring 9, after which the perforate head portion is replaced, a gasket 11 of suitable material being arranged between the large end of the body and the head portion.

In use, when it is desired to adjust the head, it is grasped by the hand, the hand engaging the perforate head portion and moved into the desired position of adjustment. The spring 9 holds the parts in such position of adjustment, which, however, is easily changed when desired. The supporting arm 3 may be connected with any suitable or desired character of fixture, in the present instance being shown connected with a common water supply pipe, by means of a connection 12.

With the improved fixture, the adjustment is extremely simple, requiring only manipulation of the head to the desired position. No tools are required, and no manipulation of any other part than the head. This is a feature of importance where an adjustment is desired for each user of the bath, or where different adjustments are required for a single user. By means of the adjustment the spray from the head may be directed to any part of the body, and the entire body may be sluiced with the discharge from the single head.

The improved sprayer in addition to the ease and facility of adjustment, may be more cheaply made than the usual construction, and installed at a lower cost.

What I claim is:—

1. In a bath fixture, the combination, with a water-supply pipe, of a spray head, a universal-joint connection between said pipe and said head, and means located within said head and forming part of said joint for attaching and detaching said head, said head including a perforate cap removable to afford access to said attaching and detaching means.

2. In a bath fixture, the combination, with a water-supply pipe, of a spray head, a yieldingly assembled universal-joint connection between said pipe and said head, and means located within said head and forming part of said joint for attaching and detaching said head, said head including a perforate cap removable to afford access to said attaching and detaching means.

3. In a bath fixture, the combination, with a water-supply pipe, of a spray head, a universal-joint connection between said pipe and said head, the members constituting said joint being assembled in abutting relationship, but independent one of the other, a spring interposed to effect and retain a yieldingly connected relationship of said members, and means located within said head and forming part of said joint for attaching and detaching said head, said head being provided with a perforate cap removable to afford access to said attaching and detaching means.

4. In a bath fixture, the combination, with a water-supply pipe, of a spray head, a universal joint connection between said pipe and said head, the members constituting said joint being assembled in abutting relationship, but independent one of the other, an exteriorly located spring interposed to effect and retain a yieldingly connected relationship of said members, and means located within said head and forming part of said joint for attaching and detaching said head, said head being provided with a perforate cap removable to afford access to said attaching and detaching means.

Signed at Philadelphia in the county of Philadelphia and State of Pennsylvania this twelfth day of July A. D. 1924.

PAUL PANHORST.